Figure 1:
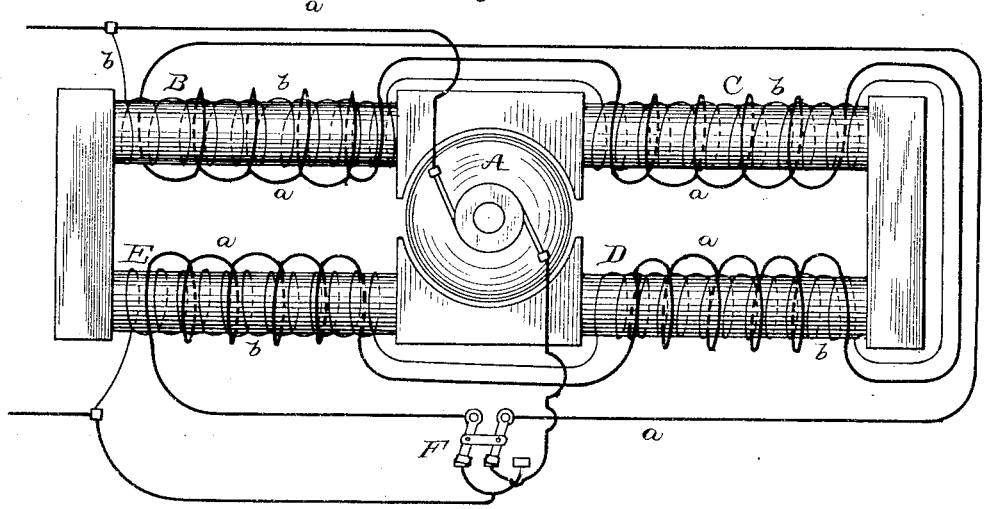

(No Model.)  2 Sheets—Sheet 1.

F. J. SPRAGUE.
ELECTRIC MOTOR AND GENERATOR.

No. 315,181. Patented Apr. 7, 1885.

ATTEST:
E. C. Rowland
T. G. Greene Jr.

INVENTOR:
Frank J. Sprague
By Dyer & Seely
Attys (No Model.)   2 Sheets—Sheet 2.

F. J. SPRAGUE.
ELECTRIC MOTOR AND GENERATOR.

No. 315,181.   Patented Apr. 7, 1885.

ATTEST:   INVENTOR:

UNITED STATES PATENT OFFICE.

FRANK J. SPRAGUE, OF NEW YORK, N. Y.

ELECTRIC MOTOR AND GENERATOR.

SPECIFICATION forming part of Letters Patent No. 315,181, dated April 7, 1885.

Application filed July 19, 1884. (No model.)

*To all whom it may concern:*

Be it known that I, FRANK J. SPRAGUE, of New York, in the county and State of New York, have invented a certain new and useful Improvement in Electric Motors and Generators, of which the following is a specification.

The object of this invention is to so construct an electro-dynamic motor or dynamo-electric generator that it will be self-regulating, so that the motor may be made to run at a constant speed under varying loads in a circuit either of constant current or constant potential, or the generator may develop a constant current or a constant electro-motive force.

The invention was designed with especial reference to motors, and I shall therefore describe it more particularly in that connection, explaining, however, its adaptability to dynamo-electric generators.

The motor used by me is a differential motor—that is, one having two sets of field-coils, one in series with the armature, which I term the "governing-coil," and the other in shunt relation to the armature. The latter coil is of higher resistance and greater number of turns than the former. It is the principal coil and determines the polarity of the field.

I have found that a certain proportion must exist between the main coil and the governing-coil to give the best results either with constant current or constant potential, and it is in this that my invention chiefly consists.

The present application relates, mainly, to those differential machines in which the main coil is shunted around both the armature and the governing or series coil. For those in which the series-coil is outside the terminals of the shunt a different law of winding prevails, and such machines are therefore considered in my application Serial No. 138,147. Some features of the present invention are applicable, however, to this second class of machines, as will be set forth in the application referred to.

For the machine with the inside series-coil the proportions which I have devised are the same in all cases, and whether the machine is used with constant current or constant potential, although the numerical values will depend upon the current and potentials used and the power required, it follows, of course, that a motor wound according to my invention may be used either on a constant current or a constant potential circuit, and will run at a constant speed in either case.

My invention can be most readily set forth and the above statements shown to be correct by a mathematical demonstration.

The magnetic moment of a coil may be defined as the product of the ampères flowing therein by the number of turns, and if the main and governing coils are practically similarly situated with regard to the field-magnet cores the magnetic field may be considered as proportional to the effective magnetic moment—that is, to the difference of the magnetic moments of the shunt and series field-coils—so long as we are working on a straight or nearly straight line characteristic. This characteristic can be determined for any particular cores in any of the well-known ways—for instance, by running the motor as a dynamo at a constant speed, passing variable known currents through the field-coils, and noting the potential existing at the free armature-terminals.

For a properly-constructed motor the field must at no time be too highly saturated—that is, it must be worked with a characteristic which is a straight or very nearly a straight line. As will be pointed out later, some deviation may be allowed, but not much.

I will first consider the motor with varying loads in a constant-potential circuit and running at constant speed.

Let $f$ denote the resistance of the main or shunt field-coils; $m$, the number of turns therein; $r$, the resistance of the differential or series field-coils, and $n$ the number of turns; E, the difference of potential at the shunt-terminals; $e$, the counter electro-motive force set up in the armature, and R the resistance of the armature. The work done $= e\dfrac{E-e}{r}$; that is, it depends upon $e$—a variable quantity—and upon the constants E and $r$. Now $e$ varies with the speed and field, or the effective magnetic moment of the field; but our conditions are that the speed remains constant; hence $e$ must vary with the field alone. Current in shunt-field $=\frac{E}{f}$; magnetic moment of same $= m\frac{E}{f}$; current in series-field $=\frac{E-e}{R+r}$; magnetic moment of same $= n\frac{E-e}{R+r}$. The effective magnetic moment must then be $m\frac{E}{f} - n\frac{E-e}{R+r}$; and our conditions are such that (for two different counter electro-motive forces or two different loads) $\frac{e}{e'} = \frac{m\frac{E}{f} - n\frac{E-e}{R+r}}{m\frac{E}{f} - n\frac{E-e'}{R+r}}$;

or $\frac{e}{e'} = \frac{mE(R+r) - nf(E-e)}{mE(R+r) - nf(E-e')}$;

or $\frac{e}{e'} = \frac{mE(R+r) - nfE + nef}{mE(R+r) - nfE + ne'f}$;

or $emE(R+r) - enfE + ene'f = e'mE(R+r) - e'n fE + e'nef$. Canceling, we have $em(R+r) - enf = e'm(R+r) - e'nf$, or $m(R+r)(e-e') = nf(e-e',)$ or $\frac{m}{n} = \frac{f}{R+r}$; that is to say, the number of turns in the shunt-coil must bear the same ratio to the number in the series-coil as the resistance of the shunt-coil bears to the sum of the resistances of the series-coil and the armature. This is the law of winding for a perfect machine of the kind mentioned, and so wound it will be perfectly self-regulating for any constant potential up to the maximum allowed by the construction of the machine, and from no load up to the maximum. There is a feature of motors so wound which may be here noticed. The ratio of the magnetic moments of the shunt and series fields is $\frac{m\frac{E}{f}}{n\frac{E-e}{R+r}}$ or $\frac{mE(R+r)}{nf(E-e)}$; but $\frac{R+r}{f} = \frac{n}{m}$; hence the above ratio $=\frac{mEn}{nm(E-e)}$ or $\frac{E}{E-e}$; that is, the ratio of the initial to the effective electro-motive force is the same as the ratio of the moments of the shunt and series coil. When $e=o$ this ratio becomes $\frac{E}{E}=1$—that is, the moments are equal—and this means that in a perfect machine, if both coils be closed and in their normal position, for any potential or current a zero-field, or practically so, will be formed, and the motor will either not start at all, or, if it does start, will run at a very great speed, take the maximum current at any given potential, and do little work, or none at all. How to obviate the bad effects of this peculiarity and to take advantage of the same forms a part of my invention, and will be hereinafter set forth.

I would again state what I have already pointed out, that the motor will regulate itself perfectly for all potentials so long as we work with a straight-line characteristic; but it must be with a theoretical efficiency of not less than fifty per cent., for if we go below this the governing-coil works in the wrong direction.

Referring to the equation $\frac{m}{n} = \frac{f}{R+r}$, it will be seen that $m$ and $f$ can be increased in the same ratio. This means that the determined constant speed of the motor can be varied for any given potential; also, $m$ and $n$ can be increased in the same ratio—that is, if means are provided for varying the effective magnetic moments of shunt and series coils, the motor can be set to run at different determined speeds.

It is evident that $f$ and $r$ can also be varied to change the speed.

Let us now consider the motor with constant speed, varying load, and constant current. Let the resistances and turns be designated as before. Let K be the constant current. Let E be the variable potential at the terminals of the motor, and $e$ the variable counter electro-motive force. The work done $=\frac{e(E-e)}{R+r}$. We must eliminate E, making it dependent upon $e$ and the constants R, $r$, $f$, and K, and hence the work can be expressed in terms of R, $r$, $f$, K, and $e$, of which $e$ is the only variable quantity. $e$ depends upon speed and field, but speed is constant; hence our conditions require that with the same current we make $e$, and hence the work, variable, but by changes in the field alone. Field-current $=\frac{E}{f}$, armature-current $=\frac{E-e}{R+r}$; but $K=\frac{e}{f}+\frac{E-e}{R+r}$; or $f(R+r)K = E(R+r) + fE - fe$, $f(R+r)K + fe = E(R+r) + fE$; or $\frac{E}{f} = \frac{(R+r)K+e}{R+r+f}$ and $K-\frac{E}{f} = \frac{fK-e}{R+r+f}$. Moment of shunt-field $= m\frac{(R+r)K+e}{R+r+f}$; moment of series-field $=n\frac{fK-e}{R+r+f}$; effective moment $\frac{m(R+r)K+me-n(fK-e)}{R+r+f}$. Our conditions are such that $\frac{e}{e'} = \frac{m}{m}$ $\frac{(R+r)K+me-n(fK-e)}{(R+r)K+me'-n(fK-e')}$; or $em(R+r)K + m ee' - nfKe + nee' = e'm(R+r)K + mee' - nfKe' + nee'$. Canceling and transferring, $m(R+r)(e-e') = nf(e-e',)$ or $\frac{m}{n} = \frac{f}{R+r}$, which is the same law as found for constant potential. The ratio of moments is $\frac{m(R+r)K+me}{nfK-ne}$. When $e=o$, this becomes $\frac{m(R+r)}{nf}$; but $\frac{R+r}{f} = \frac{n}{m}$; hence, substituting, we have $\frac{mn}{nm}=1$; that is, if the motor is at rest and any current is sent through it, a zero-field will be produced. This of course follows from what has been already said about the constant-potential motor. The potential E, which will exist if $e=E$ and no current is passing in the armature is $f$ K, and the maximum work is done when $e=\dfrac{f\text{K}}{2}.$ To be self-regulating, the motor can be worked up to this point, but not beyond it, for then the regulating-coil works in the wrong direction.

It follows from the foregoing that a machine depending for its regulation upon this differential winding will regulate with a constant current only when working at less than fifty per cent. armature efficiency, and that the same machine, with the same winding, will regulate on a constant-potential circuit only when working at over fifty per cent. armature efficiency.

The law above set forth is for pure electro-dynamic motors. If there is any permanent magnetism, as in hard cast-iron, or where permanent steel magnets are used, the law of winding is modified in so far as the residual or permanent magnetism is the equivalent of an electro-magnetic moment; but in this case, too, there should exist a zero-field if the governing-coil is normally closed when the motor is at rest.

I may here point out the fact that even with a slight flattening of the field characteristic the motor wound according to my invention may be self-regulating, because of the distortion of the lines of force by the current in the armature.

A motor constructed with different proportions than those herein set forth, or with a much curved field characteristic, may regulate to a certain extent, but not with the same range that I obtain. With a high potential the speed of such a motor will at first drop as the load is increased, then come to normal, then increase, and if the load be still further augmented and suddenly removed it will then stop and reverse, because the governing-coil becomes predominant, or it will drop and then increase to normal with the maximum load, but, if put on any higher potential, will act as in the instance first cited.

The fact hereinbefore pointed out, that in the best self-regulating motor there is a zero or very weak field when the motor is started, necessitates, especially when it is desired to start at a speed not greater than the normal, or when there is any load in the motor—in which case there is danger of burning out—the use of devices whereby the action of the governing-coil may be modified. This may be done by the introduction of a resistance, by shunting the coil with a resistance, or by the variable shunting of the armature upon the main field. I prefer, however, to use a switch to short-circuit the governing-coil or to short-circuit and reverse it. If it is reversed, then the first rush of current makes a very strong field, instead of reducing it to zero, or nearly so, increases the rotary effort and prevents the burning out of the machine. As an instance, if a constant-potential motor has the series-coil reversed when the circuit is closed, if there is margin enough on the field characteristic, we will have a field twice as strong as the strongest normal field, four times the strength when the motor is doing its maximum work per unit of time, and a momentary rotary effort eight times that existing when the maximum work is on. As soon as the speed comes up the governing-coil is short-circuited and then reversed, and then the motor is self-regulating.

In a machine wound according to my invention, if the maximum work per turn is exceeded when the governing-coil is normal, the motor will slow down and stop with a zero-field. Hence it is sometimes desirable to provide, in connection with the reversing-switch for the series-coil, automatic devices for operating the same controlled by the armature-current, so that if at any time the maximum work per turn is accidentally exceeded the governing-coil will be short-circuited and reversed, and thus the rotary power and counter electro-motive force will be increased and the motor prevented from stopping or burning out.

The proportions above described are equally applicable to the winding of the field-magnets of dynamo-electric generators, the action being simply reversed in these machines.

Figure 2:
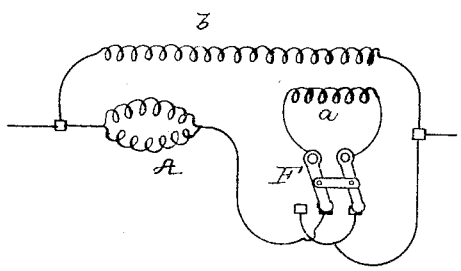
Figure 3:
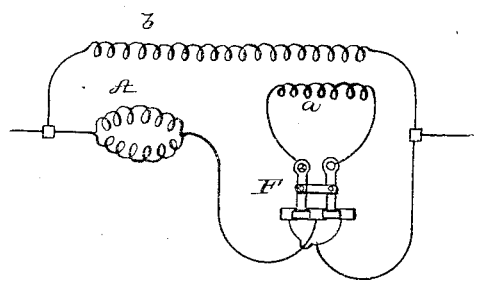
Figure 4:
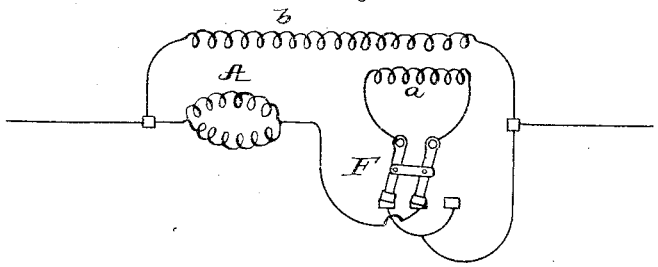
Figure 5:
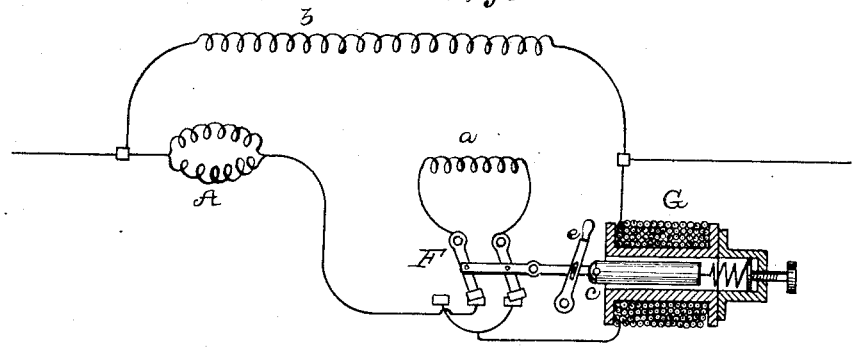

My invention is illustrated in the annexed drawings, in which Figure 1 is a view, partly in diagram, of an electro-dynamic motor embodying said invention. Figs. 2, 3, and 4 are diagrams illustrating the use of the switch for the series-coil. Fig. 5 illustrates an automatically-operating switch. Figs. 6, 7, 8, and 9 illustrate the variable shunting of the armature upon the main field-coils.

Like letters refer to corresponding parts in all these figures.

The motor shown in Fig. 1 is one having field-magnet cores extending in different directions from the same pole-pieces. My invention is, however, applicable to any other usual arrangement of field-magnets.

A is the armature, and B C D E are the magnet-cores. The coarse coil $a$ is in series with the armature, and the fine coil $b$ is shunted around both the armature and the series coil. These coils are to be wound according to the law of proportions hereinbefore set forth. It is of course understood, however, that such proportions are not illustrated in the drawings, which are intended only to show the general arrangement of the circuits.

F is the reversing-switch for the series-coil. It has three positions. In Fig. 2 the coil is directly in circuit and opposes the main coil. In Fig. 3 the coil is short-circuited or cut out of circuit. In Fig. 3 current is reversed through the coil, and it therefore acts to assist the main coil. When the motor is started the coil is reversed, as before explained, and as soon as the proper speed is reached it is short-circuited and thrown back to its normal condition.

The automatic device for the switch shown in Fig. 5 is a solenoid, G, placed in the armature-circuit, and having its movable spring-retracted core c connected with switch F. If the maximum load or work per turn on the motor is exceeded, so that too much current passes in the armature and series coil, such excessive current causes the solenoid to move the switch and first short-circuit, and then, if necessary, reverse, the series-coil. At a normal current—that is, with any load up to the maximum allowed—the spring throws the core back and maintains the direct circuit. The switch is also provided with the handle e, for working it by hand in starting the motor.

Figs. 6, 7, 8, and 9 illustrate the gradual throwing of the armature into circuit by shunting it around more or less of the main field-coils. It will be readily understood that such coils are divided into sections, and a suitable commutator is provided to shift the terminals of the armature-circuit to the different sections.

Figures 6, 7:
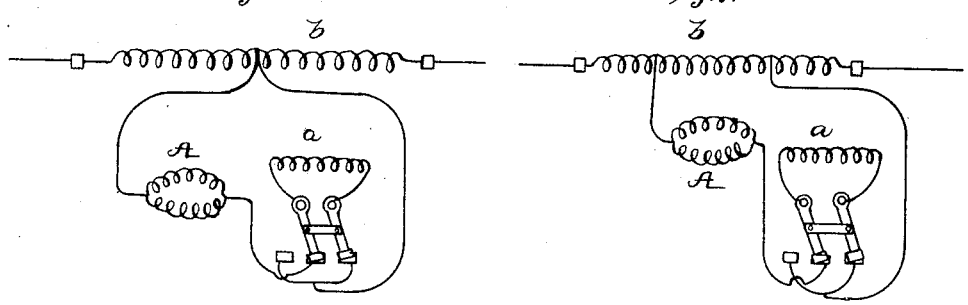

In Fig. 6 there is no current in the armature, while in Fig. 7 the armature, being shunted around more of the field-coils, receives a certain amount of current.

Figures 8, 9:
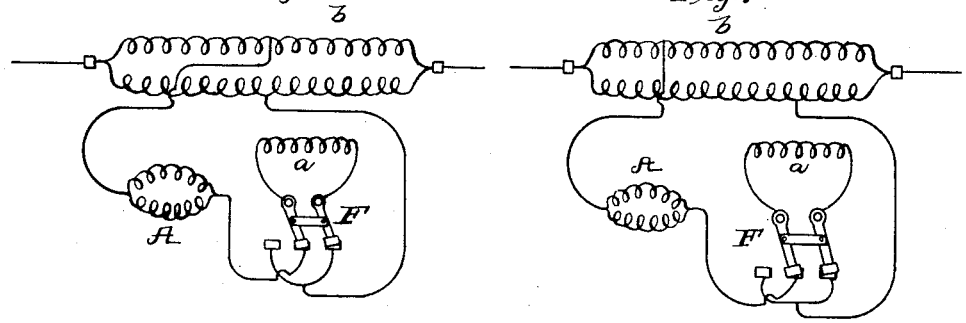

Figs. 8 and 9 show the continuous closed field-circuit set forth in my application Serial No. 134,321. In Fig. 8 no current passes in the armature, the connections being to opposite points of the closed field; but in Fig. 9 the terminals are shifted so that some current passes.

What I claim is—

1. A compound wound electro-dynamic motor or dynamo-electric generator having its two field-coils proportioned substantially as hereinbefore set forth—that is, so that the number of turns in the shunt-coil bears the same relation to the number in the series-coil as the resistance of the shunt-coil bears to the sum of the resistances of the series-coil and the armature.

2. An electro-dynamic motor having series and shunt field-magnet coils the magnetizing effects of which are equal, or nearly so, and opposed, if circuit is closed, to both sets of coils when the motor is at rest.

3. An electro-dynamic motor having one set of field-coils in series with the armature and another in a shunt around both the armature and the series coil, the magnetizing effects of which are equal, or nearly so, and opposed, if circuit is closed, to both sets of coils when the motor is at rest.

4. The combination, with an electro-dynamic motor having series and shunt field-magnet coils whose magnetizing effects are equal, or nearly so, and opposed, if circuit is closed, to both sets of coils when the motor is at rest, of means for modifying the magnetizing effect of said series-coils, substantially as set forth.

5. The combination, with an electro-dynamic motor having series and shunt field-magnet coils whose magnetizing effects are equal, or nearly so, and opposed, if circuit is closed, to both sets of coils when the motor is at rest, of means for short-circuiting the said series-coils, substantially as set forth.

6. The combination, with an electro-dynamic motor having series and shunt field-magnet coils whose magnetizing effects are equal, or nearly so, and opposed, if circuit is closed, to both sets of coils when the motor is at rest, of means for reversing the current in the said series-coils, substantially as set forth.

7. The combination, with an electro-dynamic motor having series and shunt field-magnet coils whose magnetizing effects are equal, or nearly so, and opposed, if circuit is closed, to both sets of coils when the motor is at rest, of an electro-magnetic device in the armature-circuit for modifying the magnetizing effect of the said series-coils, substantially as set forth.

8. The combination, with an electro-dynamic motor having series and shunt field-magnet coils whose magnetizing effects are equal, or nearly so, and opposed, if circuit is closed, to both sets of coils when the motor is at rest, of a short-circuiting and reversing switch for said series-coils and an electro-magnetic device in the armature-circuit for moving said switch, substantially as set forth.

This specification signed and witnessed this 2d day of July, 1884.

FRANK J. SPRAGUE.

Witnesses:
  H. W. SEELY,
  T. G. GREENE, Jr.

It is hereby certified that in Letters Patent No. 315,181, granted April 7, 1885, upon the application of Frank J. Sprague, of New York, New York, for an improvement in "Electric Motors and Generators," certain errors appear in the printed specification requiring correction, as follows: (1.) In line 51, page 1, after "required" should be a semi-colon instead of a comma. (2.) At end of line 26, page 2, the sign "$=$" should be "$-$". (3.) In line 106, page 2, "$K=\frac{e}{f}$," should read $K=\frac{E}{f}$. (4.) In line 108, page 2, after "$fe$" should be a semi-colon instead of a comma. (5.) In lines 121 and 122, page 2, the brackets at the end of the fraction should be completed. (6.) In the 4th line of the 2d claim, the 6th line of the 3d claim, and the 4th lines of the 4th, 5th, 6th, 7th, and 8th claims, the comma after the word "closed" should be omitted.

And it is certified that the proper corrections have been made in the files and records pertaining to the case in the Patent Office, and should be read in said Letters Patent to make the same conform thereto.

Signed, countersigned, and sealed this 19th day of May, A. D. 1885.

[SEAL.]

H. L. MULDROW,
*Acting Secretary of the Interior.*

Countersigned:
M. V. MONTGOMERY,
*Commissioner of Patents.*